United States Patent [19]

Regan et al.

[11] 4,278,916

[45] Jul. 14, 1981

[54] INSTANT-ON LIGHT SOURCE

[75] Inventors: Robert J. Regan, Needham; Paul O. Haugsjaa, Acton, both of Mass.

[73] Assignee: GTE Laboratories Incorporated, Waltham, Mass.

[21] Appl. No.: 99,770

[22] Filed: Dec. 3, 1979

[51] Int. Cl.³ .................. H05B 41/36; H05B 41/46
[52] U.S. Cl. .................................. 315/92; 315/49; 315/64; 315/73; 315/91; 315/311
[58] Field of Search ...................... 315/87–92, 315/129, 182, 208, 307, 311, 49, 64, 73, 193

[56] References Cited

U.S. PATENT DOCUMENTS

| 3,517,254 | 6/1970 | McNamara | 315/91 |
| 3,536,954 | 10/1970 | Haymaker et al. | 315/92 X |
| 3,693,045 | 9/1972 | Price | 315/91 |
| 3,737,719 | 6/1973 | Nodurft | 315/91 |
| 3,737,720 | 6/1973 | Willis | 315/91 |
| 4,005,331 | 1/1977 | Horowitz | 315/92 |
| 4,151,445 | 4/1979 | Davenport | 315/92 |
| 4,170,744 | 10/1979 | Hansler | 315/90 |

FOREIGN PATENT DOCUMENTS 377937 7/1964 Switzerland.
444305 2/1968 Switzerland.

OTHER PUBLICATIONS

Schriff, *Solid-State Ballasting of Mercury-Arc Lamps*, RCA Application Note AN-3616, Nov. 1973, pp. 776-788.

Primary Examiner—Eugene R. LaRoche
Attorney, Agent, or Firm—William R. McClellan

[57] ABSTRACT

A light source includes a high pressure discharge lamp and incandescent filaments which provide illumination during the warm-up and hot restart periods associated with the discharge lamp. A current regulator, which provides dc power to the discharge lamp, draws sufficient current through one filament to energize the filament only during discharge lamp warm-up. A second filament provides illumination during the period after the occurrence of a momentary power failure or power transient which is required by the discharge lamp to cool down to its maximum starting temperature. A bimetal switch permits current flow through the second filament when the discharge lamp is above the maximum starting temperature. An electronic switch permits current flow through the second filament when a current sensing resistor senses a lack of current through the discharge lamp.

17 Claims, 3 Drawing Figures

INSTANT-ON LIGHT SOURCE

BACKGROUND OF THE INVENTION

This invention relates to instant-on light sources and, more particularly, to light sources wherein a discharge lamp is combined with incandescent filaments and a solid state ballast to provide instant-on lighting.

High pressure metal vapor discharge lamps provide significantly higher efficiencies than incandescent lamps and are widely used for general lighting purposes. Such lamps can be operated from standard 60 Hz ac power but require ballast circuits for power factor correction and voltage step-up to develop the requisite high starting potential. Typical ballast circuits include a capacitor and an inductor and are large and heavy. In addition, conventional ballast circuits provide poor power regulation for line-voltage variations, are expensive, cause flicker at 60 Hz, and often introduce an audible humming noise into the environment.

An inherent disadvantage of metal vapor discharge lamps is the warm-up period of several minutes during which only a low level of illumination is available. The warm-up period or cold-start delay is due to the necessity for the metallic fill material to be vaporized and the lamp envelope to be warmed up before full light output is attained. Furthermore, when power to the lamp is momentarily interrupted, the discharge is extinguished and cannot be re-initiated until the lamp cools off and the pressure in the lamp is reduced. After the discharge is re-ignited, the warm-up period described above must be repeated before the lamp again reaches full light output. The hot restart delay is thus longer than the cold-start delay. The delays involved in starting and restarting metal vapor lamps are unacceptable in some applications, for example, in household lighting.

It is known to use standby incandescent filaments to provide illumination during the cold-start delay and hot restart delay period associated with metal vapor discharge lamps. Various arrangements have been shown in the prior art for operating an incandescent filament during cold start and hot restart periods of a discharge lamp operating at 60 Hz in conjunction with a conventional inductive ballast.

Metal vapor arc lamps have been operated at frequencies well above 60 Hz. A metal vapor arc lamp operated at 20 to 50 KHz is disclosed in U.S. Pat. No. 4,151,445 issued Apr. 24, 1979 to Davenport et al. A comparator circuit senses when the arc lamp voltage is outside a predetermined range and turns on a standby incandescent filament when the arc lamp voltage is outside that predetermined range. While the disclosed light source provides instant light output, it disadvantageously utilizes relatively heavy and expensive inductive components and it generates radio frequency interference (RFI), especially during lamp start-up, thereby potentially causing electromagnetic interference with other electronic equipment.

Metal vapor discharge lamps can be operated directly from dc power sources. Solid state dc lamp ballasts utilizing switching regulators are described by P. Schiff in "Solid-State Ballasting of Mercury-Arc Lamps" RCA Application Note AN-3616, November 1973. A solid state dc lamp ballast, commercially available from Quietlite International Ltd. under Model No. QL-75-4, utilizes a series regulator. The discharge lamp draws current from the series regulator during warm-up through a series resistor which is electronically by-passed after the discharge lamp reaches operating temperature. The problem of cold-start delay and hot restart delay remains when the discharge lamp is operated by dc power.

Solid state dc ballasts provide power regulation and eliminate heavy magnetic components, 60 Hz flicker, electromagnetic interference, and audible humming. Furthermore, the metal vapor discharge lamp is relatively efficient. Therefore, it is desirable to provide a solid state dc ballasted light source which has light output during the cold-start and hot restart periods of the discharge lamp. Such a light source is a suitable replacement for the incandescent lamp.

SUMMARY OF THE INVENTION

According to the present invention, these and other objects and advantages are achieved in an instant-on light source wherein a standby incandescent filament provides illumination during the warm-up period of a dc operated high pressure discharge lamp. The light source includes a high pressure discharge lamp and an incandescent filament. The light source also includes means for regulating current delivered to the discharge lamp. The regulating means includes a first input for receiving electrical power from a dc power source, a second input for receiving electrical power from the dc power source through the incandescent filament, and an output coupled to the discharge lamp. The second input draws sufficient current to energize the incandescent filament only during discharge lamp warm-up.

According to another aspect of the present invention, the above-described light source further includes a second incandescent filament which provides illumination during the hot restart period of the dc operated high pressure discharge lamp and filament control means coupled in series with the second filament. The filament control means is operative to permit current flow through the second filament when the filament control means senses an absence of discharge in the discharge lamp at a time when the discharge lamp is above a predetermined maximum starting temperature. The filament control means can include thermally responsive switching means, coupled in series with the second filament, and current responsive switching means. The thermally responsive switching means permits current flow through the second filament when the discharge lamp is above a predetermined temperature. The current responsive switching means includes means associated with the discharge lamp for sensing a current therethrough and means coupled in series with the second filament for permitting current flow through the second filament when the current sensing means senses that less than a predetermined current is passing through the discharge lamp. The light source can include a light transmitting envelope enclosing the discharge lamp, the incandescent filaments and the thermally responsive switching means. The light source can also include power conversion means for converting ac power to dc power for operation of the discharge lamp and the incandescent filaments.

For a better understanding of the present invention, together with other and further objects, advantages and capabilities thereof, reference is made to the following disclosure and appended claims in accordance with the above-described drawings.

DETAILED DESCRIPTION OF THE INVENTION

Figure 1:
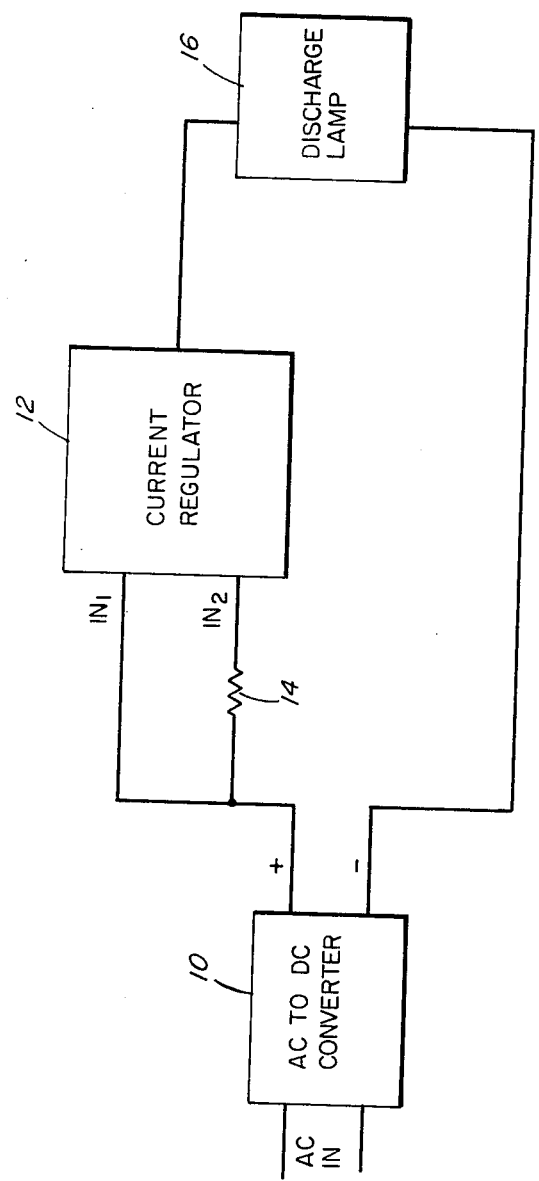
FIG. 1 is a block diagram of a discharge lamp operated from a solid state dc ballast according to the prior art.

One arrangement, according to the prior art, for supplying dc power to a discharge lamp is shown in FIG. 1. The input voltage, 60 Hz, 120 volts, is rectified, doubled and filtered by an ac to dc converter 10. A + output of the converter 10 is coupled to a first input $IN_1$ of a current regulator 12 and is coupled through a resistor 14 to a second input $IN_2$ of the current regulator 12. The output of the current regulator 12 is coupled to one terminal of a discharge lamp 16. The other terminal of the discharge lamp 16 is coupled to a − output of the converter 10. A high voltage of approximately 200 volts, which is required to initiate discharge in the lamp 16, is produced by the converter 10. After the discharge lamp 16 starts to draw current, the dc output of the converter 10 drops to a lower level. The current regulator 12 supplies the required voltage and current levels to the discharge lamp 16 during warm-up and normal operation.

High pressure discharge lamps characteristically have a low voltage immediately after discharge initiation. The lamp voltage then gradually increases over a period of several minutes as the lamp warms up and the discharge increases in intensity. During this period of reduced lamp voltage, it is necessary to limit the current flow through the lamp. The design of the current regulator 12 is such that, when power is first applied to the apparatus, substantially all the lamp current is drawn through the second input $IN_2$ and minimal current is drawn through the first input $IN_1$. Thus, the resistor 14 is effectively in series with the lamp 16 and the lamp current is limited. As the discharge lamp 16 warms up, the current drawn through the input $IN_1$ gradually increases and the current drawn through the input $IN_2$ and the resistor 14 gradually decreases. When the discharge lamp 16 reaches normal operating temperature, substantially all the lamp current is drawn through the first input $IN_1$ and the resistor 14 is effectively bypassed.

The apparatus shown in FIG. 1 produces a low level of illumination for several minutes during the warm-up period of the discharge lamp 16. Furthermore, when the power is momentarily interrupted, the discharge cannot be re-initiated and no illumination is produced until the discharge lamp 16 cools down to its maximum restart temperature. After the discharge is re-initiated, the warm-up period is repeated.

Figure 2:
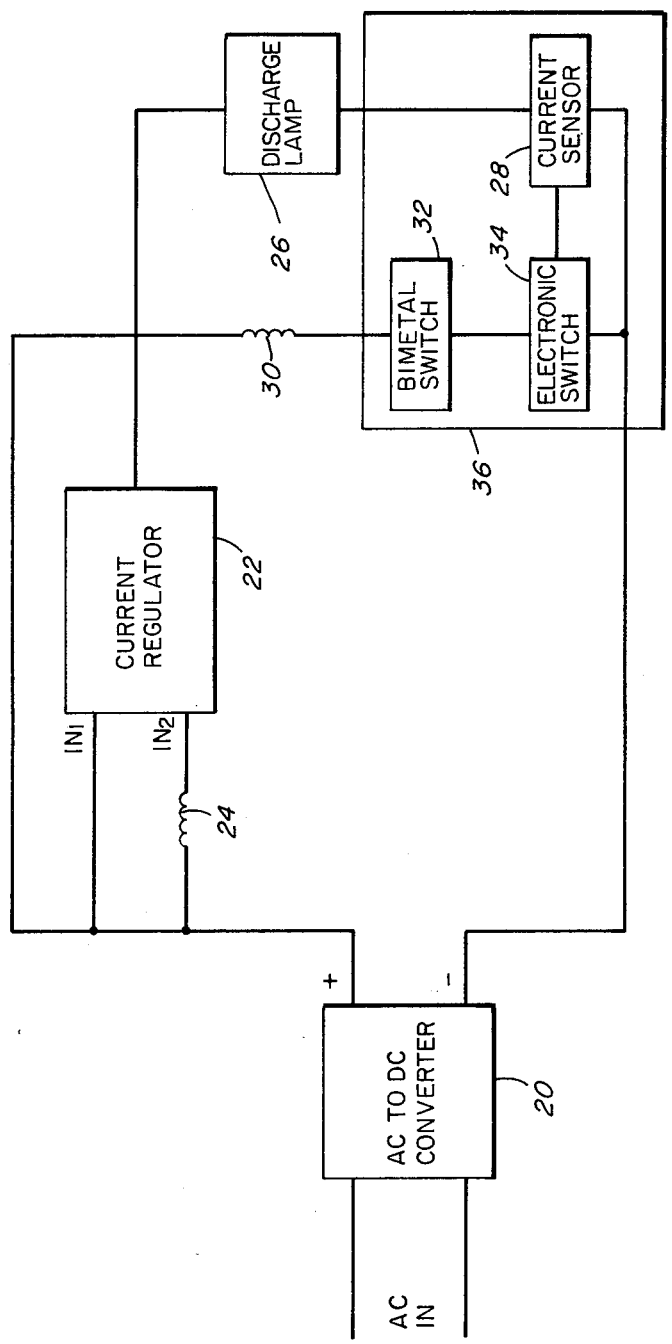
FIG. 2 is a block diagram of the light source according to the present invention.
Figure 3:
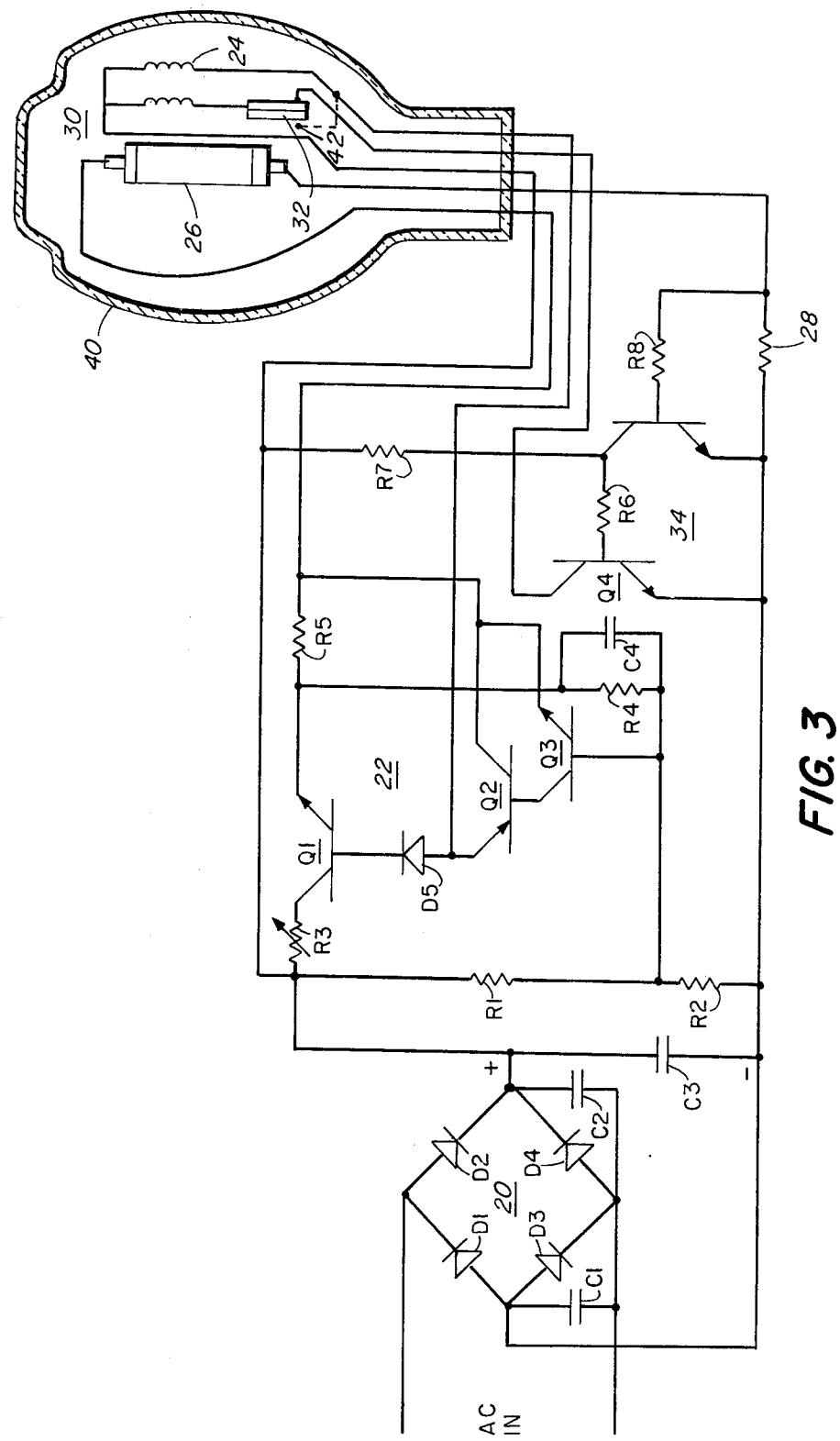
FIG. 3 is a schematic diagram of the light source according to the present invention.

A preferred embodiment of the present invention is shown in block diagram form in FIG. 2 and in schematic form in FIG. 3. A high pressure discharge lamp is supplemented by incandescent filaments during the warm-up and hot restart periods of the discharge lamp to provide an instant-on light source. As used herein, the term "instant-on" refers to what is perceived by a human observer when the light source is turned on.

Referring now to FIG. 2, an ac to dc converter 20 has a + output which is coupled to a first input $IN_1$ of a current regulator 22 and which is coupled through an incandescent filament 24 to a second input $IN_2$ of the current regulator 22. The output of the current regulator 22 is coupled to one terminal of a discharge lamp 26. The other terminal of the discharge lamp 26 is coupled through a current sensor 28 to a − output of the converter 20. The series combination of an incandescent filament 30, a thermally responsive switch illustrated as a bimetal switch 32, and an electronic switch 34 is coupled between the + and − output of the converter 20. A control input of the electronic switch 34 is coupled to the current sensor 28. The bimetal switch closes when the discharge lamp 26 is above a predetermined maximum starting temperature which can be defined as the maximum temperature at which the applied voltage automatically re-initiates discharge. The combination of the bimetal switch 32, the electronic switch 34 and the current sensor 28 form a filament control 36 which permits current flow through the filament 30 when the filament control 36 senses the absence of discharge in the discharge lamp 26 at a time when the discharge lamp is above its maximum starting temperature.

Referring now to FIG. 3, the ac to dc converter 20 includes a full wave rectifier which is formed by four diodes D1–D4 in a conventional manner. The intersection of the cathodes of the diodes D2 and D4 forms the + output of the converter 20, while the intersection of the anodes of the diodes D1 and D3 forms the − output of the converter 20. Capacitors C1 and C2 are coupled in parallel with the diodes D3 and D4, respectively, to form a voltage doubler. A filter capacitor C3 is coupled between the + output and the − output of the converter 20.

The current regulator 22, as shown in FIG. 3, includes resistors R1–R5, transistors Q1–Q3, diode D5, and capacitor C4. The + output of converter 20 is coupled through the thermal resistor R3 to the collector of the npn transistor Q1, which is a high voltage breakdown, low saturation voltage device. The point of connection between the + output of the converter 20 and the thermal resistor R3 forms the first input $IN_1$ of the current regulator 22. The + output of converter 20 is also coupled through an incandescent filament 24 to the anode of the diode D5 and to the emitter of the pnp transistor Q2 which can be a 2N6489. The point of connection between the filament 24, the anode of the diode D5, and the emitter of the transistor Q2 forms the second input $IN_2$ of the current regulator 22. The cathode of the diode D5 is coupled to the base of the transistor Q1. The + output of converter 20 is further coupled through the resistor R1 to the base of the npn transistor Q3 which can be a 2N4400. The base of transistor Q3 is coupled to the − output of the converter 20 through the resistor R2 so that the resistors R1 and R2 form a voltage divider across the outputs of the converter 20. The base of the transistor Q3 is also coupled through a parallel connection of the resistor R4 and the capacitor C4 to the emitter of the transistor Q1. The collector of the transistor Q3 is coupled to the base of the transistor Q2. The emitter of the transistor Q1 is coupled through the resistor R5 to one terminal of a discharge lamp 26. The collector of the transistor Q2 and the emitter of the transistor Q3 are also coupled to the one terminal of the discharge lamp 26. The point of connection between the collector of the transistor Q2, the emitter of the transistor Q3, the resistor R5, and the discharge lamp 26 forms the output of the current regulator 22. The other terminal of the discharge lamp 26 is coupled through a current sensing resistor 28 to the − output of the converter 20. One suitable filament 24 has a cold resistance of 14 ohms and produces illumination at 120 volts with a resistance at 120 volts of 200 ohms. Suitable values of R1–R5 for operation of a 75 watt discharge lamp are as follows:

R1—300 kilohms
R2—180 kilohms
R3—200 ohms (cold)
R3—3 ohms (hot)
R4—3 ohms
R5—5 ohms An incandescent filament 30, a thermally responsive switch illustrated as a bimetal switch 32, and an electronic switch 34 are coupled in series between the + output and the − output of the converter 20. While the resistance of the filament 30 can be any convenient value, it should provide adequate illumination during restart. One suitable filament has a cold resistance of 21 ohms and produces illumination of 120 volts with a resistance at 120 volts of 300 ohms. The electronic switch 34, as shown in FIG. 3, includes transistors Q4 and Q5 and resistors R6–R8. The junction point of current sensing resistor 28 and the discharge lamp 26 is coupled through the current limiting resistor R8 to the base of the npn transistor Q5. The collector of the transistor Q5 is coupled through the current limiting resistor R6 to the base of the npn transistor Q4 and through the biasing resistor R7 to a voltage source such as the + output of the converter 20. The collector of the transistor Q4 is coupled to the bimetal switch 32. The emitters of the transistors Q4 and Q5 are coupled to the − output of the converter 20. The bimetal switch 32 is in sufficiently close proximity to the discharge lamp 26 to sense its temperature and is in a closed position, as shown in FIG. 3, when the discharge lamp 26 is above a predetermined temperature.

In operation, the current regulator 22 includes two main current paths for the discharge lamp 26 current, one through the transistor Q1 which conducts during normal operation of the discharge lamp 26 and the other through the transistor Q2 which conducts during the warm-up period of the discharge lamp 26. As used herein, the term "normal operation" refers to operation of the discharge lamp 26 after it has reached steady-state operating temperature and excludes the transient operation during the warm-up and hot restart periods of the discharge lamp 26.

The input voltage, typically 60 Hz, 120 volts, is rectified and doubled by the diodes D1–D4 and the capacitors C1 and C2 and filtered by the capacitor C3 to produce, between the + and − outputs of the converter 20, a dc voltage with some 120 Hz ripple. It is to be understood that the starting and operating voltage requirements of various high pressure discharge lamps vary depending on their type and size. Therefore, voltage doublers or other voltage multipliers are utilized in the converter 20 only when required to operate the discharge lamp 26. When power is first applied, the converter 20 produces in excess of 200 volts at its output as required for initiation of a discharge in a 75 watt lamp 26. After discharge initiation and during normal operation, the voltage across the capacitor C3 drops to approximately 120 volts because of the loading effect of the discharge lamp 26.

When power is first applied to the light source depicted in FIG. 3 and the discharge lamp 26 is cold, a low intensity discharge is initiated in the lamp 26 and a low voltage appears across the lamp. The voltage at the base of the transistor Q3 is higher than the discharge lamp 26 voltage at this time, thereby biasing the transistors Q3 and Q2 on. Discharge lamp 26 current is drawn through filament 24 and transistor Q2, thereby energizing filament 24, which not only provides illumination during the warm-up of the discharge lamp 26, but also provides a dc resistive ballast for the discharge lamp 26. During the warm-up period, the transistor Q2 is biased on and the low saturation voltage of the transistor Q2, appearing across the series combination of the diode D5, the base to emitter junction of transistor Q1 and resistor R5, biases transistor Q1 off. During the warm-up period, the bimetal switch 32 is in the open position and the incandescent filament 30 is de-energized.

As the discharge lamp 26 gradually warms up and approaches its normal operating temperature, the intensity of the discharge therein and the voltage thereacross increase. Eventually, the discharge lamp 26 voltage, appearing at the emitter of transistor Q3, is greater than the base voltage of transistor Q3, causing the transistors Q3 and Q2 to be biased off. When transistor Q2 is biased off, the transistor Q1 is biased on by current supplied through the filament 24 and the diode D5 to the base of transistor Q1. During the warm-up period, the thermal resistor R3 is decreasing in resistance and the current through the transistor Q1 increases. The net effect during the warm-up period is a gradual transfer of discharge lamp 26 current from the transistor Q2 to the transistor Q1 and a gradual de-energization of the filament 24. When the transistor Q2 is biased off, the filament 24 supplies only transistor Q1 base current which is insufficient to produce illumination from the filament 24. The filament 24 therefore provides illumination immediately upon application of power and during the warm-up of the discharge lamp 26.

During normal operation of the light source of FIG. 3, the transistor Q2 is biased off, the transistor Q1 is biased on and provides current to the discharge lamp 26, and the filament 24 provides no illumination as described hereinabove. Also during normal operation, the temperature of the discharge lamp 26 is above the predetermined maximum switching temperature of the bimetal switch 32 which therefore is closed and couples the filament 30 to the electronic switch 34. The lamp current passing through the current sensing resistor 28 produces a voltage which biases the transistor Q5 on. The low voltage at the collector of the saturated transistor Q5 biases the transistor Q4 off and the electronic switch 34 is in the open or nonconducting state. Thus, the filament 30 is de-energized during normal operation of the discharge lamp 26.

The operation of the light source of FIG. 3 during hot restart is described as follows. When the power is momentarily interrupted, the discharge in the lamp 26 is extinguished and no current flows through the discharge lamp 26 and the resistor 28. The voltage across resistor 28 is zero and the transistor Q5 is biased off which, in turn, permits base current to be supplied to the transistor Q5 through resistors R6 and R7 and the transistor Q4 is biased on. Thus, the electronic switch 34 is in the closed or conducting state. Since the power interruption was momentary, the discharge lamp 26 is still hot and the bimetal switch 32 maintains the connection between the filament 30 and the electronic switch 34. The applied voltage, now in excess of 200 volts, is unable to start the discharge lamp 26 in its hot condition. The filament 30 provides illumination immediately after power interruption and during the cooling down period of the discharge lamp 26 prior to restart. The discharge lamp 26 gradually cools to its predetermined maximum starting temperature and the applied voltage automatically re-initiates discharge. The predetermined temperature at which the bimetal switch 32 operates is slightly below the restart temperature of the discharge lamp 26. Thus, the filament 30 provides illumination until the discharge in the lamp 26 is re-initiated and current flow through the discharge lamp 26 and the resistor 28 is re-established. The re-established current flow through the resistor 28 causes the electronic switch 34 to open and the filament 30 to be de-energized. Immediately after the discharge is re-initiated, the discharge lamp 26 is well below normal operating temperature and provides a low level of illumination. At this time, the warm-up sequence described hereinabove is repeated and the filament 24 provides illumination until the discharge lamp 26 reaches normal operating temperature.

The present invention can be utilized with high pressure discharge lamps which can operate at a relatively constant current and an increasing voltage during the warm-up period. A lamp with a voltage drop very near the dc supply voltage is preferred since less power must be dissipated in the filament or current regulator during normal, fully warmed-up operation. Such discharge lamps are well known in the art and are commercially available. Examples of such lamps are high pressure sodium lamps, high pressure mercury vapor lamps, and metal halide lamps. Typically, high pressure discharge lamps include a quartz or alumina cylindrical discharge tube enclosed by a glass outer envelope. The fill material is enclosed within the cylindrical discharge tube. In the case of mercury vapor lamps, a phosphor coating on the outer envelope converts ultraviolet radiation produced by the discharge to visible light. One suitable mercury vapor lamp is GTE Sylvania, 75 watt, model H43AY-75DX. Other lamps, particularly lower power lamps which are more suitable for replacement of incandescent lamps, can be built by one skilled in the art and used in the present invention.

According to the present invention, the discharge lamp 26, the incandescent filaments 24 and 30, and the bimetal switch 32 can be enclosed by a single envelope 40 as illustrated in FIG. 3. The inner surface of the envelope 40 can be coated with a phosphor, for example, when the discharge lamp 26 is a mercury vapor lamp. Alternatively, the filaments 24 and 30 can be enclosed by a light transmitting envelope (not shown) which is placed with the discharge lamp 26 and the bimetal switch 32 within the envelope 40. This configuration has the advantage of preventing any material emitted by the discharge lamp 26 from contaminating the filaments 24 and 30. In another but less preferred alternative, the discharge lamp 26 and the bimetal switch 32 are enclosed by the envelope 40 and the filaments 24 and 30 are enclosed by a separate envelope (not shown) which is external to the envelope 40.

It is to be understood that various changes and modifications can be made to the preferred embodiment of FIGS. 2 and 3 without departing from the scope of the present invention. Any suitable ac to dc converter, well known to those skilled in the art and capable of providing the requisite starting and operating voltages, can be utilized. Furthermore, the light source can be operated from various input frequencies and voltage levels by a suitable choice of an ac to dc converter. Finally, the light source can be operated from a battery or other dc source.

The filament control 36 can include various sensors and switching circuits which are operative to permit current flow through the filament 30 when the discharge lamp 26 is above a predetermined temperature but has no discharge therein. For example, the current sensor 28 can be replaced by a photosensor which senses the light output of the discharge lamp 26. With respect to the electronic switch 34, various well known switching circuits can be used to control the current through the filament 30. The bimetal switch 32 can be replaced, for example, by a switching circuit controlled by a thermocouple. The bimetal switch can also include a set of contacts 42, as shown in FIG. 3, which are closed when the discharge lamp 26 is below the predetermined switching temperature. The added contacts are used to connect the filaments 24 and 30 in parallel, as shown by the dotted connection between the contacts 42 and the filament 24, thus providing additional illumination during the warm-up period. Above the predetermined switching temperature, the filament 30 is coupled by the bimetal switch to the electronic switch 34 as above-described.

While there has been shown and described what is at present considered the preferred embodiment of the invention, it will be obvious to those skilled in the art that various changes and modifications may be made therein without departing from the scope of the invention as defined by the appended claims.

What is claimed is:

1. An instant-on light source comprising:
    a high pressure discharge lamp;
    a first incandescent filament having a first terminal for receiving electrical power from a dc power source;
    current regulating means for delivering regulated current to said discharge lamp, said regulating means including an output coupled to said discharge lamp, a first input for receiving electrical power from said dc power source, and a second input coupled to a second terminal of said first filament for receiving electrical power through said first filament, said second input drawing sufficient current to energize said first filament only during discharge lamp warm-up;
    a second incandescent filament having a first terminal for receiving electrical power from said dc power source; and
    filament control means, coupled in series with said second filament, for permitting current flow through said second filament when said filament control means senses an absence of discharge in said discharge lamp at a time when said discharge lamp is above a predetermined maximum starting temperature.

2. The instant-on light source as defined in claim 1 wherein said filament control means includes:
    thermally responsive switching means, coupled in series with said second filament, for sensing that said discharge lamp is above said predetermined temperature and for permitting current flow through said second filament when said discharge lamp is above said predetermined temperature; and
    current responsive switching means including means associated with said discharge lamp for sensing current therethrough and electronic switching means, coupled in series with said second filament and said thermally responsive switching means, for permitting current flow through said second filament when said current sensing means senses that less than a predetermined current is passing through said discharge lamp.

3. The instant-on light source as defined in claim 2 further including a first light transmitting envelope enclosing said discharge lamp, said first and second incandescent filaments, and said thermally responsive switching means.

4. The instant-on light source as defined in claim 3 wherein said thermally responsive switching means includes bimetal switching means.

5. The instant-on light source as defined in claim 4 wherein said bimetal switching means further includes means for coupling a second terminal of said second filament to the second input of said current regulating means when said discharge lamp is below said predetermined temperature.

6. The instant-on light source as defined in claim 5 wherein said current sensing means includes a resistor coupled in series with said discharge lamp.

7. The instant-on light source as defined in claim 6 wherein said electronic switching means includes transistor switching means.

8. The instant-on light source as defined in claim 7 further including a second light transmitting envelope enclosing said first and second incandescent filaments within said first light transmitting envelope.

9. The instant-on light source as defined in claim 7 wherein said discharge lamp includes a mercury vapor arc lamp and said first light transmitting envelope includes a phosphor coating on an inner surface thereof.

10. An instant-on light source comprising:
a high pressure discharge lamp;
a first incandescent filament;
a second incandescent filament;
power conversion means for converting ac power to dc power for operation of said discharge lamp and said filaments, said power conversion means having an output coupled to a first terminal of said first filament and a first terminal of said second filament and having an input for receiving ac power;
current regulating means for delivering regulated current to said discharge lamp, said regulating means including an output coupled to said discharge lamp, a first input coupled to the output of said power conversion means, and a second input coupled to a second terminal of said first filament, said second input drawing sufficient current through said first filament to energize said first filament only during discharge lamp warm-up;
thermally responsive switching means, coupled in series with said second filament, for sensing that said discharge lamp is above a predetermined temperature and for permitting current flow through said second filament when said discharge lamp is above said predetermined temperature; and
current responsive switching means including means associated with said discharge lamp for sensing current therethrough and electronic switching means, coupled in series with said second filament and said thermally responsive switching means, for permitting current flow through said second filament when said current sensing means senses that less than a predetermined current is passing through said discharge lamp.

11. The instant-on light source as defined in claim 10 further including a first light transmitting envelope enclosing said discharge lamp, said first and second incandescent filaments and said thermally responsive switching means.

12. The instant-on light source as defined in claim 11 wherein said thermally responsive switching means includes bimetal switching means.

13. The instant-on light source as defined in claim 12 further including a second light transmitting envelope enclosing said first and second incandescent filaments within said first light transmitting envelope.

14. The instant-on light source as defined in claim 12 wherein said discharge lamp includes a mercury vapor arc lamp and said first light transmitting envelope includes a phosphor coating on an inner surface thereof.

15. An instant-on light source comprising:
a high pressure discharge lamp;
an incandescent filament having a first terminal for receiving electrical power from a dc power source;
first current control means, coupled between a second terminal of said incandescent filament and a first terminal of said discharge lamp, for supplying current to said discharge lamp through said incandescent filament during discharge lamp warm-up, said first current control means including means operative to decrease the current therethrough in response to an increasing voltage across said discharge lamp during discharge lamp warm-up; and
second current control means, coupled to said first terminal of said discharge lamp, for supplying current from the dc power source to said discharge lamp, said second current control means being operative to supply an increasing current during discharge lamp warm-up and to supply normal operating current after discharge lamp warm-up,
whereby said first incandescent filament provides illumination during discharge lamp warm-up.

16. The instant-on light source as defined in claim 15 wherein said first and said second current control means each include transistor current control means.

17. The instant-on light source as defined in claim 16 wherein said second current control means includes means operative to increase the current therethrough in response to a decreasing current through said incandescent filament.

* * * * *